July 7, 1964  A. B. GRÖNBERG  3,139,918
STRAW CUTTER
Filed Jan. 11, 1963
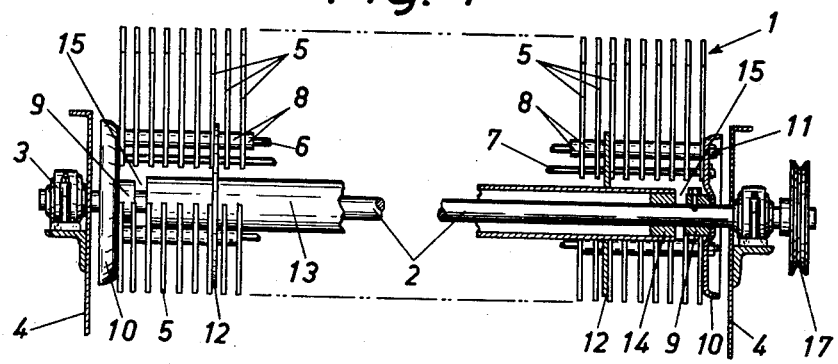
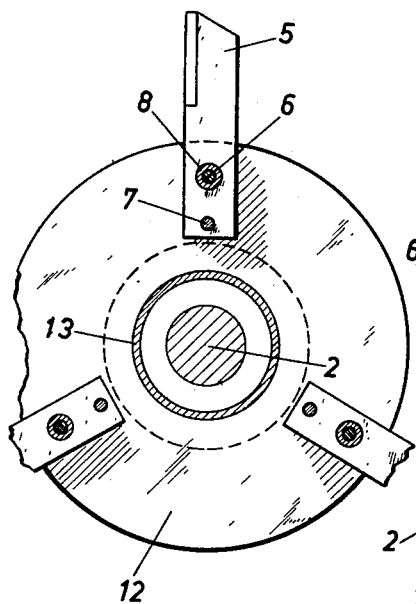
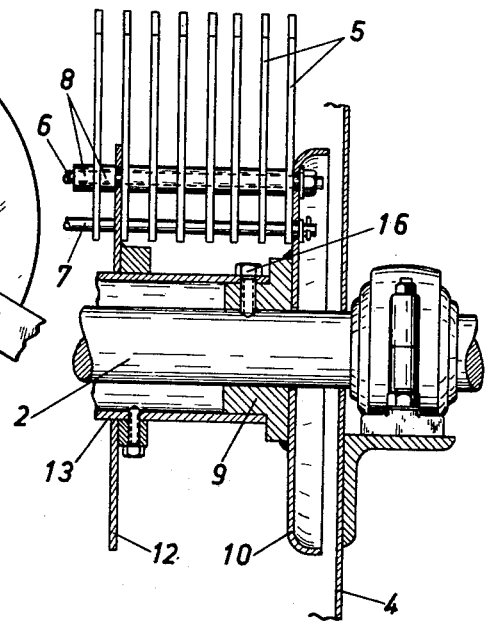
INVENTOR.
Anton Bertil Grönberg
BY
Cushman, Darby & Cushman

United States Patent Office 3,139,918
Patented July 7, 1964

3,139,918
STRAW CUTTER
Anton Bertil Grönberg, Villa Karlsborg, Ottum, Sweden
Filed Jan. 11, 1963, Ser. No. 250,838
Claims priority, application Sweden Jan. 22, 1962
4 Claims. (Cl. 146—121)

This invention has reference to rotary cutters for the disintegration of straw and similar material. Cutters of the kind under consideration comprise a plurality of arms arranged in rows and preferably provided with cutting edges, said arms extending outwardly from a shaft which carries two end disks. The arms together with intermediary disks are secured for rotation with the shaft by a clamp bolt which passes through the two end disks and through the inner ends of the arms and the intermediate disks, the arms being held in spaced relationship by spacer sleeves surrounding the bolt. The cutter has a feeding opening for the straw to be cut and a discharge opening for the disintegrated straw. As a rule, the machine is provided with a number of stationary arms directed towards the rotor and provided with cutting edges, said stationary arms serving as a grate at the point of disintegration of the straw by means of the rotor arms. The rotor is driven with a rather high periphery speed and the mass forces will consequently be considerable. The rotor has to be exactly balanced as otherwise strong vibrations will occur during the operation of the machine.

The introduction of stones or other hard objects with the straw cannot always be avoided. These objects could cause a break in one or more of the rotor arms and this would cause an unbalance of the rotor. Upon continuous operation of the rotor, vibrations are formed which are detrimental to the machine.

The present invention has for its object to eliminate this drawback and to make the machine less sensitive to occurring unbalances. According to the invention the intermediary disks are carried by a tube surrounding the shaft, said tube having its ends carried by the shaft in the vicinity of the end disks. The tube could be attached to the hubs of the end disks. However, an even better result is obtained if the ends of the tube are provided with bushings by means of which they are carried by the shaft at some distance from the hubs of the end disks.

Due to this tube the rotor shaft cannot even at a considerable unbalance of the rotor be set into detrimental vibrations. The operation of the machine will thus be quiet and its work excellent. No notable vibrations occur in the machine housing which could be transmitted to the base plate or the building in which the machine is arranged. The same thing is true also when the machine is attached to the rear end of a combine below its straw discharge.

An example of a machine in accordance with the invention will now be described with reference to the accompanying, partly diagrammatic drawing. In the drawing:

FIG. 1 shows a partly cut longitudinal section through the rotor of a cutter according to the invention, FIG. 2 shows on an enlarged scale one end of the rotor according to another embodiment of the invention, and FIG. 3 shows a portion of a cross section through the rotor according to FIG. 2.

The rotor 1 of the cutter is carried by a shaft 2 which is journalled in bearings 3 on the gable walls 4 of a housing enclosing the rotor and having a feeding opening for the straw material to be cut and a discharge opening for the disintegrated material. The rotor 1 comprises a number—preferably three—of rows of essentially radially extending arms 5 with cutting edges. At their ends adjacent the shaft 2 all the arms 5 in each row are passed through by a clamping bolt 6 and a stay bolt 7. The arms 5 are held at some distance from each other by means of spacer sleeves 8 passed through by the clamping bolt 6. The latter extends at its ends also through two end disks 10 with hubs 9 and the whole row of arms 5, spacer sleeves 8 and end disks 10 are kept together by a tightening of nuts 11 on the outer ends of the clamping bolts 6.

The clamping bolts 6 and the stay bolts 7 also extend through intermediary disks 12 arranged with equal spaces along the whole length of the rotor. These intermediary disks 12 are arranged on or carried by a tube 13 put on the shaft 2, said tube carried by the shaft only at its ends. According to the embodiment shown in FIG. 1 the tube 13, having a diameter which is considerably greater than the diameter of the shaft 2, is at its ends provided with bushings 14 by means of which the tube 13 is carried by the shaft 2 in the vicinity of the hubs 9 of the end disks 10. It is advisable to choose the length of the tube 13 in such a way that a small space remains between the tube ends and the hubs 9. The mounting of the arms 5 is facilitated as the tube 13 and also the intermediary disks 12 can be moved axially relatively to the shaft 2 and the end disks 10. The intermediary disks 12 do not have to be attached to the tube 13 but can only abut against the same and should then be movable on the tube.

In the embodiment shown in FIGS. 2 and 3 the tube 13 is fitted on the hubs 9 of the end disks 10. The hubs 9 are provided with a screw 16 or the like by means of which the force from the shaft 2 is transmitted to the respective end disk 10 and thus also to the rows of arms 5.

As obvious from FIG. 1 a driving pulley 17 is arranged on one end of the shaft 2.

The present invention has been described in detail above for purposes of illustration only and is not intended to be limited by this description or otherwise except as defined in the appended claims. Thus, certain modifications are possible within the scope of the invention. The stay bolts 7 can be replaced by other means for keeping the arms in an essentially outwardly directed position.

What I claim is:

1. A rotary cutter for disintegrating straw and the like comprising: a rotatable shaft; an end disk secured to said shaft at each end thereof; a metal tube surrounding said shaft and extending substantially the length of said shaft between said end disks, the inside diameter of said tube being considerably larger than the outside diameter of said shaft; means at each end of said tube mounting the same for rotation with said shaft, the remainder of said tube being free of said shaft; a plurality of rows of cutter arms disposed outwardly of said tube between said end disks and extending radially outwardly; a plurality of intermediary disks disposed between said end disks; at least one clamping bolt associated with each row of arms and extending through said end disks, arms and intermediary disks; and spacer sleeves on each clamping bolt for maintaining said arms and intermediary disks in predetermined, spaced relationship.

2. A rotary cutter as in claim 1 wherein said end disks have hubs facing inwardly and wherein said mounting means includes means securing the ends of said tube to said hubs.

3. A rotary cutter as in claim 1 wherein said mounting means includes a bushing between each end of said tube and said shaft.

4. A rotary cutter as in claim 1 wherein said tube passes through a hole in each intermediary disk and wherein each intermediary disk is directly secured to the exterior of said tube at the location of the hole.

References Cited in the file of this patent

UNITED STATES PATENTS

| | | |
|---|---|---|
| 1,348,751 | Searby | Aug. 3, 1920 |
| 2,509,242 | Miller et al. | May 30, 1950 |

FOREIGN PATENTS

| | | |
|---|---|---|
| 93,769 | Norway | Feb. 14, 1959 |